W. C. CLEGHORN.
VEHICLE TIRE.
APPLICATION FILED JULY 8, 1911.
1,044,352.
Patented Nov. 12, 1912.
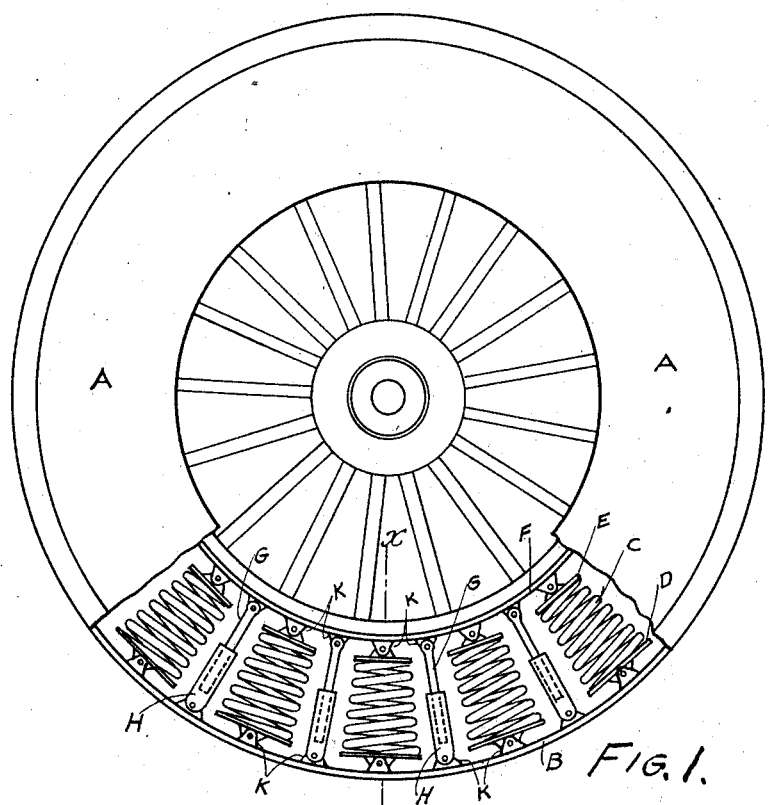
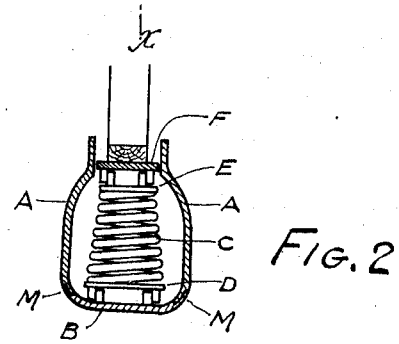
WITNESSES
W. C. Cleghorn.
INVENTOR

UNITED STATES PATENT OFFICE.

WALTER C. CLEGHORN, OF BLOOMINGTON, ILLINOIS.

VEHICLE-TIRE.

1,044,352.  Specification of Letters Patent.  Patented Nov. 12, 1912.

Application filed July 8, 1911. Serial No. 637,584.

*To all whom it may concern:*

Be it known that I, WALTER C. CLEGHORN, a citizen of the United States, residing at Bloomington, in the county of McLean and State of Illinois, have invented new and useful Improvements in Vehicle-Tires, of which the following is a specification.

This invention provides a tire designed most especially for the wheels of automobiles and analogous mechanically propelled road machines, the purpose being to supply a tire which is resilient so as to absorb shock and vibration and which is practically puncture-proof and not susceptible to injury by passing over sharp objects which cut through pneumatic and cushion tires.

The invention contemplates a tire embodying concentric rings, helical springs interposed between the rings and having a radial arrangement and guide devices for connecting the rings in a manner to brace them laterally without interfering with their relative movement in the plane of the wheel to compensate for change of position of the load and relative play due to passing over uneven places in the surface of the road.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a side view of a vehicle wheel embodying the invention, a portion of the casing being broken away. Fig. 2 is a detail cross section on the line $x$—$x$ of Fig. 1, the spring being in full.

The tire comprises an inner ring F, an outer ring B and a plurality of interposed helical springs C, said springs having a radial arrangement and being secured at their ends to the rings in any substantial way. The rings F and B may have any form in cross section. The tire is adapted to be secured by means of the inner ring F to the felly of the vehicle wheel. The outer ring B may have a tread of any type fitted thereto. The helical springs C are conical and of the expansible type and are of a strength to support the load for which the tire is designed. Spring sockets D and E receive the ends of the springs C and are pivoted by means of lugs K to the rings F and B. Any means may be employed to secure the springs C to the sockets D and E.

Guides are interposed between the rings F and B and consist of members G and H, each having pivotal connection with a ring to admit of the members having a limited play in the plane of the wheel whereby the rings may have a circumferential movement. The guide member H has a socket in which the guide member G has a piston fit. The members G and H are pivotally attached to the respective rings by means of lugs K and pins passing transversely through openings formed therein. The guides are preferably located between the springs C.

Annular plates A close the sides of the space formed between the rings F and B and are connected at their outer edges to the edges of the ring B. The inner edge portions of the plates A are pressed together so as to come close to the outer edges of the ring F to form a close joint therewith. The plates A are jointed in any manner to the ring B, the joints being halved or overlapped, as indicated at M. The rings F and B and the annular plates A form a casing which receives the springs C and the telescoping guides G and H. The casing prevents dirt and foreign matter from reaching the springs and guides and interfering with their free operation.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

A tire for vehicle wheels comprising spaced concentric rings provided upon their opposing faces with a plurality of lugs, sockets provided with lugs which are pivotally connected to the lugs of the rings, expansible helical springs seated in said sockets and normally pressing the rings apart so as to yieldably support the load, socket guide members pivotally connected to the lugs of one of the rings, and piston guide members pivotally connected to the lugs of the other ring and fitting snugly within the said socket guide members, the guide members being arranged between the springs.

In testimony whereof I affix my signature in presence of two witnesses.

WALTER C. CLEGHORN.

Witnesses:
GEORGE F. JORDAN,
MARY GUNN.

Copies of this patent may be obtained for five cents each, by addressing the "Commissioner of Patents, Washington, D. C."